US012626334B2

(12) United States Patent
Lee et al.

(10) Patent No.: US 12,626,334 B2
(45) Date of Patent: May 12, 2026

(54) METHOD AND DEVICE WITH IMAGE PROCESSING

(71) Applicant: SAMSUNG ELECTRONICS CO., LTD., Suwon-si (KR)

(72) Inventors: Wonhee Lee, Suwon-si (KR); Seungeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 18/318,475

(22) Filed: May 16, 2023

(65) Prior Publication Data

US 2024/0161238 A1     May 16, 2024

(30) Foreign Application Priority Data

Nov. 8, 2022     (KR) ......................... 10-2022-0147961

(51) Int. Cl.
*G06T 5/00* (2024.01)
*G06N 3/04* (2023.01)
(Continued)

(52) U.S. Cl.
CPC .................. *G06T 5/00* (2013.01); *G06T 5/50* (2013.01); *G06T 2207/20084* (2013.01)

(58) Field of Classification Search
CPC ... G06T 5/00; G06T 5/50; G06T 2207/20084; G06T 9/002; G06N 3/0455;
(Continued)

(56) References Cited

U.S. PATENT DOCUMENTS

| | | | |
|---|---|---|---|
| 8,155,454 B2 | 4/2012 | Raveendran | |
| 8,204,132 B2 * | 6/2012 | Choi ...................... | H04N 19/44 |
| | | | 382/233 |

(Continued)

FOREIGN PATENT DOCUMENTS

| | | |
|---|---|---|
| CN | 113298894 A | 8/2021 |
| CN | 114760472 A | 7/2022 |
| KR | 10-2313651 B1 | 10/2021 |

OTHER PUBLICATIONS

Li, Qinghai, et al. "Learning-based video compression framework with implicit spatial transform for applications in the internet of things." IEEE Transactions on Industrial Informatics 19.5 (2022): 6576-6587. (Year: 2022).*

(Continued)

*Primary Examiner* — Stephen R Koziol
*Assistant Examiner* — Joshua Chen
(74) *Attorney, Agent, or Firm* — Sughrue Mion, PLLC

(57) ABSTRACT

An electronic device, including one or more processors configured to execute instructions; and a memory storing the instructions which, when executed by the one or more processors, configures the one or more processors to generate high-quality feature data of a current frame, by implementing a feature restoration model that is provided reference feature data, received by an electronic device, and corresponding to compressed feature data of a reference image corresponding to a first time that is different from a second time to which the current frame corresponds, and low-quality feature data received by the electronic device, and corresponding to compressed data of the current frame, that has a lower image quality than the reference image; and generate a current frame of a third image quality higher than the second image quality, based on the high-quality feature data.

19 Claims, 7 Drawing Sheets

(51) Int. Cl.

| | |
|---|---|
| *G06N 3/0455* | (2023.01) |
| *G06N 3/0464* | (2023.01) |
| *G06T 5/50* | (2006.01) |
| *H04N 19/105* | (2014.01) |

(58) Field of Classification Search
CPC ........ G06N 3/0464; G06N 3/088; G06N 3/04; H04N 19/124; H04N 19/154; H04N 19/172; H04N 19/537; H04N 19/51; H04N 19/513; H04N 19/105; H04N 19/177

See application file for complete search history.

(56) References Cited

U.S. PATENT DOCUMENTS

| | | | |
|---|---|---|---|
| 10,250,923 B2 | 4/2019 | Gilson | |
| 2020/0404340 A1 | 12/2020 | Xu et al. | |
| 2021/0250809 A1 | 8/2021 | Masule et al. | |
| 2022/0188976 A1* | 6/2022 | Sun ....................... | G06T 3/4053 |
| 2022/0329807 A1* | 10/2022 | Xiao .................... | G06N 3/0464 |
| 2025/0159214 A1* | 5/2025 | Zhang .................. | G06N 3/0455 |

OTHER PUBLICATIONS

Sun, Zhenhong, et al. "Spatiotemporal entropy model is all you need for learned video compression." arXiv preprint arXiv: 2104.06083 (2021). (Year: 2021).*

Extended European Search Report Issued on Feb. 5, 2024, in Counterpart European Patent Application No. 23190767.6 (8 Pages in English).

Chen et al. "AV1 in-loop filtering using a wide-activation structured residual network." 2019 *IEEE International Conference on Image Processing (ICIP)*. IEEE, 2019. (pp. 1725-1729).

He et al. "A video compression framework using an overfitted restoration neural network." *Proceedings of the IEEE/CVF Conference on Computer Vision and Pattern Recognition Workshops*. 2020 (pp. 1-5).

Khani et al. "Efficient video compression via content-adaptive super-resolution." *Proceedings of the IEEE/CVF International Conference on Computer Vision*. 2021., ICCV 2021 (pp. 4521-4530).

Sun et al. "Spatiotemporal Entropy Model is All You Need for Learned Video Compression." *arXiv preprint arXiv*:2104.06083, Apr. 13, 2021 (pp. 1-18).

Huang et al. "Neural compression-based feature learning for video restoration." *Proceedings of the IEEE/CVF Conference on Computer Vision and Pattern Recognition*. 2022 (pp. 1-16).

Li et al. "Hybrid Spatial-Temporal Entropy Modelling for Neural Video Compression." *Proceedings of the 30th ACM International Conference on Multimedia*. Oct. 10-14, 2022 (pp. 1-17).

* cited by examiner

100

METHOD AND DEVICE WITH IMAGE PROCESSING

CROSS-REFERENCE TO RELATED APPLICATIONS

This application claims the benefit under 35 USC § 119(a) of Korean Patent Application No. 10-2022-0147961, filed on Nov. 8, 2022, in the Korean Intellectual Property Office, the entire disclosure of which is incorporated herein by reference for all purposes.

BACKGROUND

1. Field

The following description relates to a method and device with image processing.

2. Description of Related Art

A Motion Estimation (ME) technique may be used for video compression (encoding). The ME technique identifies a motion vector by referring to pixels from one image frame to another image frame. The ME technique may be a compression method that is based on temporal redundancy of a video, and compress a video by removing the temporal redundancy, using data of video frames around an image frame that is being compressed. Advanced Video Coding or MPEG-4 Part 10 (e.g., H264 codec) and High-Efficiency Video Coding or MPEG-H Part 2 (e.g., H265 codec) are example codecs that use such temporal based encoding, where b and p-frames may be temporally encoded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a system includes one or more processors configured to execute instructions; and a memory storing the instructions which, when executed by the one or more processors, configures the one or more processors to generate high-quality feature data of a current frame, by implementing a feature restoration model that is provided reference feature data, received by an electronic device, and corresponding to compressed feature data of a reference image corresponding to a first time that is different from a second time to which the current frame corresponds, and low-quality feature data received by the electronic device, and corresponding to compressed data of the current frame, that has a lower image quality than the reference image; and generate a current frame of a third image quality higher than the second image quality, based on the high-quality feature data.

The execution of the instructions configures the one or more processors to restore the reference image using a first decoder provided the reference data, and wherein the reference feature data may be representative of having been generated by performing quantization on a feature map of the reference frame extracted from the reference frame, and the low-quality feature data may be representative of having been generated by performing quantization on a feature map of the current frame extracted from the current frame.

In the execution of the instructions, the one or more processors may be configured to restore the reference frame from the reference feature data.

In the execution of the instructions, the one or more processors may be configured to perform dequantization on the reference feature data to generate dequantized reference feature data; and generate the restored reference frame from the dequantized reference feature data.

In the execution of the instructions, the one or more processors may be configured to perform dequantization on the high-quality feature data to generate dequantized high-quality feature data; and generate the current frame of the third image quality from the dequantized high-quality feature data.

The reference frame may correspond to an I frame comprised in a group of pictures (GOP) of a video having a plurality of frames, and the current frame may correspond to a B frame or a P frame comprised in the GOP.

The electronic device may further include a storage device configured to store respective received reference feature data for each of two or more GOPs.

The feature restoration model may be a neural network comprising any one or any combination of two or more of a convolution layer, a first layer, and an attention layer, and a transformer-based neural network.

The feature restoration model may be trained based on at least one of a first loss function based on a difference between high-quality feature data, which is extracted by encoding a current training frame of a second image quality, and high-quality feature data of the current training frame, which is output by the feature restoration model that receives, as inputs, reference feature data extracted from a reference training frame of the first image quality and low-quality feature data extracted from the current training frame; and a second loss function based on a difference between the current training frame and a current training frame restored by decoding the high-quality feature data extracted by encoding the current training frame.

In a general aspect, an electronic device includes a communication device configured to receive reference feature data extracted from a reference frame of a first image quality; receive first low-quality residual data that indicates a difference between low-quality feature data of a previous frame and low-quality feature data extracted from a current frame of a second image quality lower than the first image quality, or receive second low-quality residual data extracted from a residual frame between a motion compensation frame, in which a motion of the current frame is compensated for, and a motion compensation frame, in which a motion of the previous frame is compensated for, and one or more processors configured to execute instructions; and a memory storing the instructions which, when executed by the one or more processors, configures the one or more processors to: generate low-quality feature data of the current frame, based on the low-quality feature data of the previous frame and the first low-quality residual data, in response to a receipt of the first low-quality residual data; generate high-quality feature data of the current frame, by implementing a first feature restoration model that receives the reference feature data and the low-quality feature data of the current frame as inputs; and generate a current frame of a third image quality higher than the second image quality, based on the high-quality feature data.

In the execution of the instructions, the one or more processors are configured to in response to receipt of the second low-quality residual data, generate motion-compensated reference feature data, which is generated by applying a motion compensation value to the reference feature data, and high-quality residual data by implementing a second feature restoration model that is provided the second low-quality residual data; generate a decoded residual frame by decoding the high-quality residual data; and generate a current frame of a fourth image quality higher than the second image quality, based on the decoded residual frame and an inter-predicted current frame.

In a general aspect, a processor-implemented method includes generating high-quality feature data of a current frame, by implementing a feature restoration model that is provided reference feature data, received by an electronic device, and corresponding to compressed feature data of a reference image corresponding to a first time that is different from a second time to which the current frame corresponds, and low-quality feature received by the electronic device, and corresponding to compressed data of the current frame, that has a lower image quality than the reference image; and generating a current frame of a third image quality higher than the second image quality, based on the high-quality feature data.

The reference feature data may be representative of having been generated by performing quantization on a feature map of the reference frame extracted from the reference frame, and the low-quality feature data may be representative of having been generated by performing quantization on a feature map of the current frame extracted from the current frame.

The method may further include restoring the reference frame from the reference feature data.

The restoring of the reference frame may include performing dequantization on the reference feature data to generate dequantized reference feature data; and generate the restored reference frame from the dequantized reference feature data.

The generating of the current frame of the third image quality may include performing dequantization on the high-quality feature data to generate dequantized high-quality feature data; and generating the current frame of the third image quality from the dequantized high-quality feature data.

The reference frame may correspond to an I frame comprised in a group of pictures (GOP) of a video having a plurality of frames, and the current frame may correspond to a B frame or a P frame included in the GOP.

The feature restoration model may be a neural network comprising any one or any combination of two or more of a convolution layer, a first layer, and an attention layer, and a transformer-based neural network.

In a general aspect, an electronic device includes one or more processors configured to execute instructions; and a memory storing the instructions which, when executed by the one or more processors, configures the one or more processors to generate first reference feature data from a first reference frame, and first other feature data from a first current frame, corresponding to a different time than the first reference frame, where the first reference frame information includes more intra-frame image information than the first current frame; control a transmission, corresponding to a first stream from the electronic device to another electronic device, of the first feature data and the first other feature data for decoding by the other electronic device for generation of a restored first reference frame and a restored first current frame; receive, in a second stream from the other electronic device to the electronic device, second reference feature data as compressed information of a second reference image, second other feature data as compressed information for a second current frame, and an additional second other feature data as additional compressed information for an additional second current frame, where each of the second reference feature data, the second other feature data, and the additional other feature data are frames corresponding to different times within the second stream. and where the second reference frame information includes more intra-frame image information than the second current frame and the additional second current frame; restore the second reference frame from the second reference feature data; restore the second current frame based on first feature data generated by a first implementation of a feature restoration machine learning model that is provided inputs that are respectively based on the second reference feature data and the second other feature data, with the first feature data representing more intra-frame image information than the second other feature data; and restore the additional second current frame based on second feature data generated by a second implementation of the feature restoration machine learning model that is provided inputs that are respectively based on the second reference feature data and the additional second other feature data, with the second feature data representing more intra-frame image information than the additional second other feature data, wherein the first stream and the second stream are concurrently respectively transmitted and received by the electronic device for a same video conference.

The second other feature data may be one of a first residue corresponding to the second current frame and a lowered quality version of the second reference feature data, or a second residue corresponding to the second current frame and a result of a motion compensation of another frame for the second stream that is subsequent to the second current frame, and wherein the additional second other feature data is one, corresponding to the one of the first residue and the second residue, of a third residue corresponding to the additional second current frame and a lowered quality version of the additional second reference feature data, or a fourth residue corresponding to the additional second current frame and a result of a motion compensation of an additional frame for the second stream that is subsequent to the additional second current frame.

In the first implementation of the feature restoration machine learning model, the feature restoration machine learning model may be provided the second residue and a motion compensated version of the second reference feature data, and in the second implementation of the feature restoration machine learning model, the feature restoration machine learning model may be provided the fourth residue and another motion compensated version of the second reference feature data.

The reference frame may correspond to an I frame comprised in a group of pictures (GOP) of a video having a plurality of frames, and the current frame may correspond to a B frame or a P frame comprised in the GOP.

Other features and aspects will be apparent from the following detailed description, the drawings, and the claims.

Figure 1:
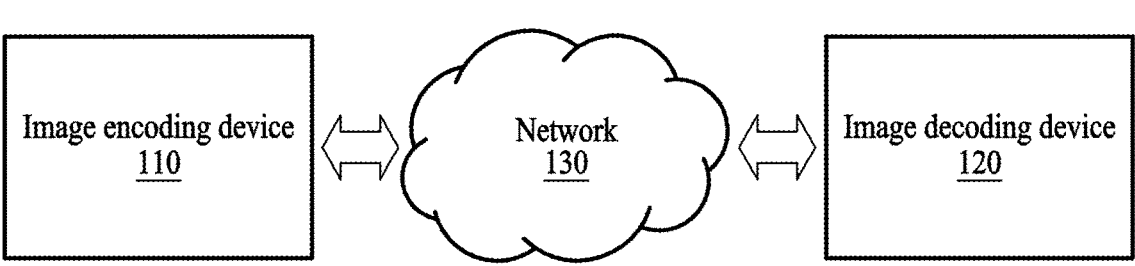
FIG. 1 illustrates an overview of an example system with image co, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items. The phrases "at least one of A, B, and C", "at least one of A, B, or C', and the like are intended to have disjunctive meanings, and these phrases "at least one of A, B, and C", "at least one of A, B, or C', and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an overview of an example image coding system, in accordance with one or more embodiments.

Referring to FIG. 1, an image coding system 100 may include an image encoding device 110, an image decoding device 120, and a network 130.

The image encoding device 110 may be a device that processes (e.g., encodes) image data, such as a video or moving pictures, including a plurality of image frames and transmits the processed image data to an external device. As a non-limiting example, the image encoding device 110 may include a content providing device that provides video content, a video broadcasting device, or a terminal that transmits a video in a video call or a video conference. However, the examples are not limited thereto. In an example, the image encoding device 110 may not transmit all image data, but may generate encoded data of which the volume is reduced by encoding image data to reduce the amount of image data transmission and increase a transmission speed based on the reduced amount of data.

Image data (e.g., compressed image data) processed by the image encoding device 110 may be transmitted (or forwarded) to the image decoding device 120 through the network 130. In a non-limiting example, the processed image data transmitted from the image encoding device 110 to the image decoding device 120 may be feature data (e.g., a feature map) of original image data, which is extracted through an encoding process. The network 130 may include, as only examples, a wired network of a cable network, a short-range wireless network, or a long-range wireless network. The short-range wireless network may include Bluetooth, wireless-fidelity (Wi-Fi), or infrared data association (IrDA), and the long-range wireless network may include a legacy cellular network, 3G/4G/5G networks, a next-generation communication network, the Internet, or a computer network (e.g., a local area network (LAN) or a wide area network (WAN)).

The image decoding device 120 may receive image data (e.g., feature data of image data) encoded by the image encoding device 110 through the network 130. In an example, encoded image data generated by the image encoding device 110 may be transmitted directly to the image decoding device 120 over the network 130 or via one or more other devices. In an example, the image decoding device 120 may be an electronic device (e.g., an electronic device 200 of FIG. 2) in various forms. In an example, the image decoding device 120 may be a portable communication device (e.g., a smartphone), a computer device, a portable multimedia device (e.g., a tablet PC), a camera, a wearable device, a set-top box, an image streaming device, a content storage device, or a home appliance (e.g., a television (TV)). However, the electronic device is not limited to the devices disclosed above.

The image decoding device 120 may process the encoded image data and provide an image to a user. For example, the image decoding device 120 may decode the encoded image data and provide image data restored based on the decoding operation to the user. The data volume of original image data may be reduced based on the encoding operation performed by the image encoding device 110, and some information included in the original image data may be lost during such an encoding process. The image decoding device 120 may generate image data having a greater image quality than the encoded image data by restoring the information lost in the encoding process of the image data through the decoding process. In examples, the encoding of the image data may include compressing the image data, and the decoding of the encoded image data may include decompressing or restoring the compressed image data.

In an example, the image decoding device 120 may restore the image quality of another low-quality image frame, based on feature data of a high-quality image frame previously transmitted. In an example, the image decoding device 120 may perform decoding by implementing a machine learning feature restoration model neural network-based feature restoration model (e.g., a feature restoration model 340 of FIG. 3, a feature restoration model 535 of FIG. 5, and a feature restoration model 630 of FIG. 6). Such a neural network may refer to a machine learning model in which a plurality of nodes (or neurons), which form a network by synaptic coupling, change the strength of the synaptic coupling through training or machine learning to have an ability to solve problems. Briefly, any such reference herein to "neurons" is not intended to impart any relatedness with respect to how the neural network architecture computationally maps or thereby intuitively recognizes or considers information, and how a human's neurons operate. In other words, the term "neuron" is merely a term of art referring to the hardware connections implemented operations of nodes of a neural network, and will have a same meaning as the node of the neural network. The nodes of a neural network may include weighted connections, or a combination of the weights and a respective bias, and the neural network may include one or more layers each including a plurality of nodes. The weights and biases of a layer structure or between layers or nodes may be collectively referred to as connectivity of the neural network, and a non-limited example.

The image decoding device 120 may receive low-quality feature data of a current frame, the feature restoration model may restore the low-quality feature data of the current frame to high-quality data of the current frame, based on provided high-quality feature data of a previous frame. The image decoding device 120 may similarly improve or restore the image quality of other low-quality image data using the provided high-quality image data, or other provided high-quality image data, using the feature restoration model. In an example, the feature restoration model receives feature data as inputs rather than an image frame itself, the feature restoration model that receives feature data as inputs may perform fewer calculations compared to a feature restoring model that receives the image frame as an input. By using the feature restoration model, the image coding system 100 may effectively improve the image quality of low-quality image data while maintaining a transmitted high compression rate to encode image data through the feature restoration model. The image coding system 100 may use a pre-trained feature restoration model instead of training, and transmitting of the corresponding frame specific parameters of the feature restoring model, so that the image coding system 100 may be applied to an application that streams image content in real time (e.g., a video conference and a video call).

Figure 2:
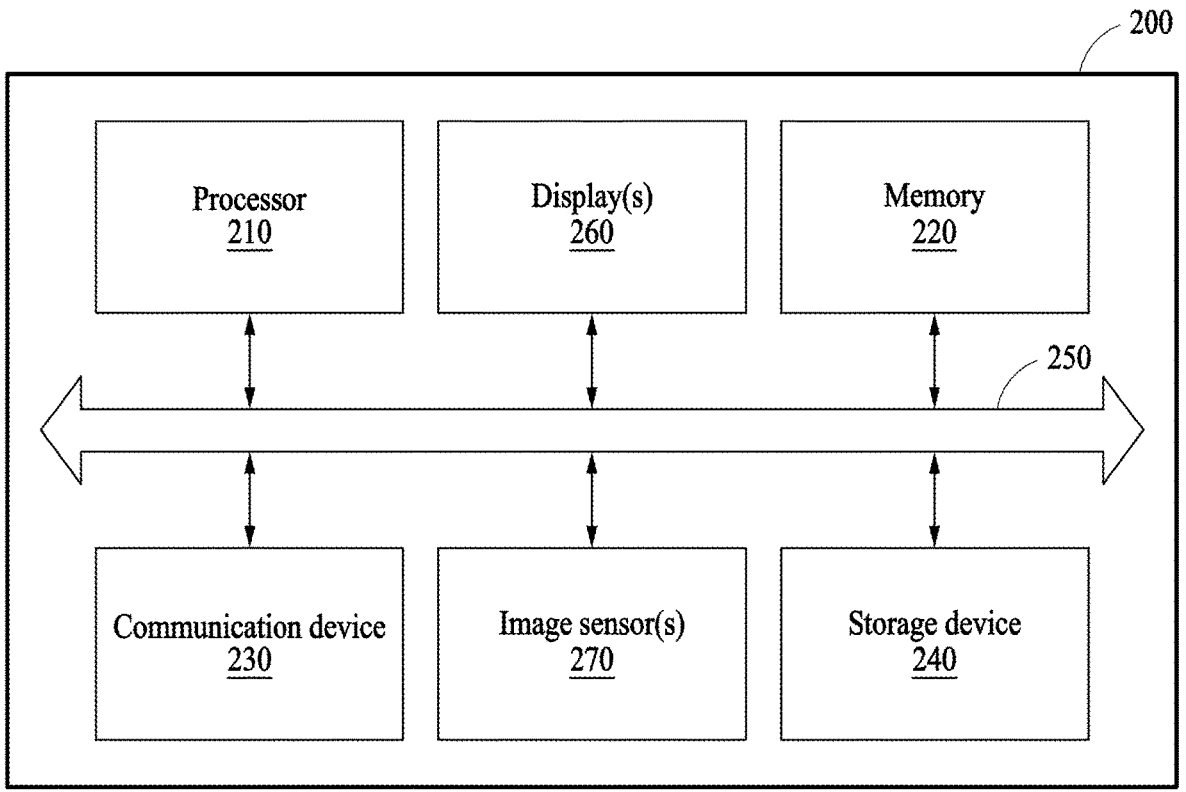
FIG. 2 illustrates a configuration of an example electronic device, in accordance with one or more embodiments.

FIG. 2 illustrates a configuration of an example electronic device, in accordance with one or more embodiments.

Referring to FIG. 2, an electronic device 200 may be a device that processes image data and may, for example, correspond to the image decoding device 120 of FIG. 1. The electronic device 200 may include a processor 210, a memory 220, a communication device 230, and a storage device or system 240, e.g., a wired and/or wireless transceiver or other hardware interface to a wired or wireless communication network without transmitting or receiving model parameters for decoding temporally compressed frames. The processor 210 and the memory 220 may be respectively representative of one or more processors 210 and one or more memories 220. Each component of the electronic device 200 may communicate with each other via a communication bus 250. In an example, at least one of the components (e.g., the storage device 240, the image sensor 270, and/or the display 260) of the electronic device 200 may be omitted from the electronic device 200, and/or one or more other components may be added to the electronic device 200.

The processor 210 may control at least one of the components of the electronic device 200 and may perform various data processing operations or various computations. According to an example, as at least a part of the data processing operations or computations, the processor 210 may store instructions or data received from another device (e.g., using the communication device 230) in the memory 220, process the instructions or the data stored in the memory 220, and store result data in the memory 220. In an example, the processor 210 is configured to execute instructions stored in the memory 220, which when executed by the processor 210, configure the processor 210 to perform any combination of processes and/or methods described herein.

According to an example, the processor 210 may include a main processor (e.g., a central processing unit (CPU) or an application processor (AP)) or an auxiliary processor (e.g., a graphics processing unit (GPU), a neural processing unit (NPU), an image signal processor (ISP), a sensor hub processor (SHP), or a communication processor (CP)) that is operable independently of, or in conjunction with the main processor.

The memory 220 may store a variety of pieces of data used by at least one component (e.g., the processor 210 or the communication device 230) of the electronic device 200. The data may include, for example, a program (e.g., an application) for various operations and functionalities of the electronic device 100, e.g., in addition to such encoding and. or decoding operations described herein, and input data or output data for a command related thereto. The memory 220 may store instructions that are executable by the processor 210. The memory 220 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 120 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

The communication device 230 may support establishing a direct (e.g., wired) communication channel or a wireless communication channel between the electronic device 200 and an external electronic device (e.g., the image encoding device 110 of FIG. 1 or a server) and performing communication via the established communication channel (CP). The communication device 230 may include a communication circuit configured to perform a communication operation. The communication device 230 may include one or more CPs that are operable independently of the processor 210 and that support direct (e.g., wired) communication or wireless communication. According to an example, the communication device 230 may include a wireless communication device (e.g., a Bluetooth communication module, a cellular communication device, a Wi-Fi communication device, or a global navigation satellite system (GNSS) communication device) or a wired communication device (e.g., a LAN communication device or a power line communication device). For example, the communication device 230 may include one or more corresponding modems, and/or transceivers.

The storage device 240 may store data. The storage device 240 may include, for example, non-volatile memory, such as flash memory, read-only memory (ROM) and a magnetic computer memory device (e.g., a hard disk), in which stored data is maintained even when data is blocked, but is not limited thereto. The storage module 240 may also include volatile memory, such as static random access memory (SRAM) and dynamic random access memory (DRAM). In an example, the storage module 240 may assist the function of the memory 220 and may be used to temporarily or non-temporarily store data.

The electronic device 200 may further include a display (260), which may visually provide information to the outside of the electronic device 200 (e.g., to a user). In an example, the display device may output an image frame decoded by the processor 210. The display may include, as examples, a liquid crystal display (LCD) or an organic light-emitting diode (OLED) display, a hologram device, or a projector device. The display may further include a control circuit configured to control the driving of the display.

In an example, the communication device 230 may receive reference feature data extracted from a reference frame of a first image quality. For example, the reference frame may include at least some or a significant amount of intra-frame feature information. The reference frame may be an image frame of the first image quality corresponding to a first time among a plurality of image frames included in a video. For example, the image sensor 270 may capture the video and/or corresponding frames. The reference feature data may be generated during an encoding process performed by an image encoding device (e.g., the image encoding device 110 of FIG. 1). In the encoding process, the reference feature data may be obtained by performing quantization on a feature map of the reference frame extracted by a first encoder (e.g., a first encoder 310 of FIG. 3 below) that takes the reference frame as an input. The first encoder may be a neural network that is trained to extract feature data of a feature map from input data (e.g., an image frame). The reference feature data may be transmitted from the image encoding device 110 to the electronic device 200. The configuration of the image decoding device 200 may also be representative of the configuration of the image encoding device, where the corresponding processor 210 of the image encoding device may execute instructions that configure the processor to perform any one or any combination of the encoding of the first and second encoders described herein. In an example, the electronic device 210 of the electronic device 200 is configured to perform both encoding and decoding operations, e.g., in parallel for respective different video streams.

The processor 210 may perform image processing by executing instructions stored in the memory 220. In an example, the processor 210 may restore a reference frame corresponding to the first image quality, based on the received reference feature data. The processor 210 may perform dequantization on the reference feature data to generate dequantized reference feature data and may obtain a restored reference frame, using a first decoder (e.g., a first decoder 325 of FIG. 3) that receives the inverse-quantized reference feature data as an input. In an example, the first decoder may be a neural network that is trained to output an image frame restored from input data (e.g., feature data, such as a feature map).

The communication device 230 may receive low-quality feature data extracted from a current frame having a second image quality lower than the first image quality. For example, the current frame may include no or some corresponding intra-frame feature information of the current frame, but this is still less than included in the reference image frame. Thus, the reference frame may have a greater or high-image quality compared to a lesser or low-image quality of the current frame. As a further example, in some I, B, P frame compression schemes I frames may be compressed using intra-frame prediction for image information of the I frame. Rather, the B and P frames may be compressed using inter-frame prediction, such as through motion vectors of the B or P frames with respect to the I frame, and thus the B and P frames may include substantially less intra-frame feature information than the I frame. Similarly, if feature information is extracted from the reference image and encoded, the resultant reference feature data would represent more intra-frame information than feature data for the current frame resulting from an encoding of feature information extracted from the current frame. As another example, if the quantization applied to an encoded result of the current frame is greater than the quantization applied to an encoded result of the reference frame, the reference feature data would also represent more intra-frame image information than the feature data corresponding to the current frame. The current frame may be an image frame of the second image quality corresponding to a second time later than the first time of the reference frame among a plurality of image frames included in a video. In an example, the reference frame may correspond to an I frame included in a group of pictures (GOP), and the current frame may be a B frame or a P frame included in the GOP.

The communication device 230 may receive reference feature data extracted from I frames included in each of the GOPs, and the storage module 240 may store reference feature data extracted from the I frames included in each of the GOPs. The reference feature data stored in the storage device 240 may be used to restore low-quality feature data of the current frame into high-quality one. The storage device 240 may perform the operations of a buffer that stores the reference feature data.

The low-quality feature data extracted from the current frame may be generated during the encoding process performed by the image encoding device. In the encoding process, the low-quality feature data may be obtained by performing quantization on a feature map of the current frame extracted by a second encoder (e.g., a second encoder 330 of FIG. 3) that takes the current frame as an input. The processor 210 may obtain high-quality feature data of the current frame by implementing a feature restoration model (e.g., the feature restoration model 340 of FIG. 3) that takes stored reference feature data and the received low-quality feature data as inputs. The processor 210 may obtain a current frame having a third image quality greater than the second image quality, based on the obtained high-quality feature data. To perform this regeneration of current frame, processor 210 may generate dequantized high-quality feature data by performing dequantization on the obtained high-quality feature data, and may obtain the current frame of the third image quality using a second decoder (e.g., a second decoder 350 of FIG. 3) that receives the dequantized high-quality feature data as an input. In an example, the third image quality may be equal to or less than the first image quality of the reference frame or greater than the second image quality of the reference frame.

The feature restoration model may be a model that is trained to output high-quality feature data in which low-quality feature data is improved based on input data (e.g., reference feature data and low-quality feature data). The feature restoration model may be, for example, a neural network including a convolution layer, a neural network including an attention layer, or a transformer-based neural network, but is not limited thereto. The neural network may be implemented through a hardware and/or a software. The feature restoration model may be trained based on at least one of a first loss function and a second loss function. The first loss function may be defined based on a difference between high-quality feature data, which is extracted by encoding a current training frame, e.g., using the second encoder, and high-quality feature data of the current training frame, which is output by the feature restoration model that receives, as inputs, reference feature data extracted from a previous reference training frame of a first image quality and low-quality feature data extracted from the current training frame of a second image quality. The second loss function may be defined based on a difference between the current training frame and a current training frame restored by decoding the high-quality feature data extracted by encoding a current learning frame. In an example, parameters of the feature restoration model may be trained based on the sum of the first loss function and the second loss function toward minimizing this sum during the training process of the feature restoration model.

The processor 210 may restore a reference frame for the reference feature data of each received reference frame, using the first decoder provided a received high-quality reference feature data without an image processing process based on the feature restoration model. When the processor 210 receives low-quality feature data extracted from a current frame having an image quality lower than the reference frame, the processor 210 may restore the low-quality feature data to a high-quality one, using the received high-quality reference feature data and the feature restoration model. In an example, the restored high-quality feature data of the current frame represents an improvement in image quality of the low-quality feature data of the current frame using the high-quality reference feature data.

In an example, the communication device 230 may receive reference feature data extracted from the reference frame of the first image quality, and the processor 210 may restore a reference frame based on the reference feature data. After that, residual data instead of the low-quality feature data of the current frame may be transmitted from the image encoding device. In an example, this residual data may be first low-quality residual data representing a difference between low-quality feature data of a previous frame and low-quality feature data extracted from a current frame having the second image quality lower than the first image quality. In response to receiving the first low-quality residual data, the processor 210 may obtain low-quality feature data of the current frame based on the low-quality feature data of the previous frame and the received first low-quality residual data. The processor 210 may obtain high-quality feature data of the current frame by implementing a feature restoration model (e.g., the feature restoration model 630 of FIG. 6) that is provided the low-quality feature data of the current frame and the received first image quality reference feature data as inputs. The processor 210 may obtain the restored current frame having a third image quality greater than the second image quality based on the obtained high-quality feature data. This example is described in more detail with reference to FIG. 6.

In an example, the communication device 230 may receive reference feature data extracted from the reference frame of the first image quality, and the processor 210 may restore a reference frame based on the reference feature data. Thereafter, residual data, instead of the low-quality feature data of the current frame having the second image quality lower than the first image quality, may be transmitted from the image encoding device. In an example, the residual data may be second low-quality residual data extracted from a residual frame corresponding to a difference between a motion compensation frame for which the motion of a current frame is compensated for and a previous motion compensation frame for which the motion of a previous frame is compensated for. In response to receiving the second low-quality residual data, the processor 210 may obtain high-quality residual data using a second feature restoration model (e.g., the feature restoration model 535 of FIG. 5), taking motion-compensated reference feature data generated by applying a motion compensation value to the received reference feature data, e.g., to transform or warp the received reference feature data, corresponding to the reference frame that is previous to the current frame, to be transformed to be with respect to the current frame, rather than the previous frame, and second low-quality residual data as inputs. The processor 210 may obtain a decoded residual frame by decoding the generated high-quality residual data. The processor 210 may obtain a current frame having a fourth image quality higher than the second image quality based on the decoded residual frame and an inter-predicted current frame. In an example, the fourth image quality may be equal to or less than the first image quality of the reference frame, or greater than the second image quality. This example is described in more detail with reference to FIG. 5.

Figure 3:
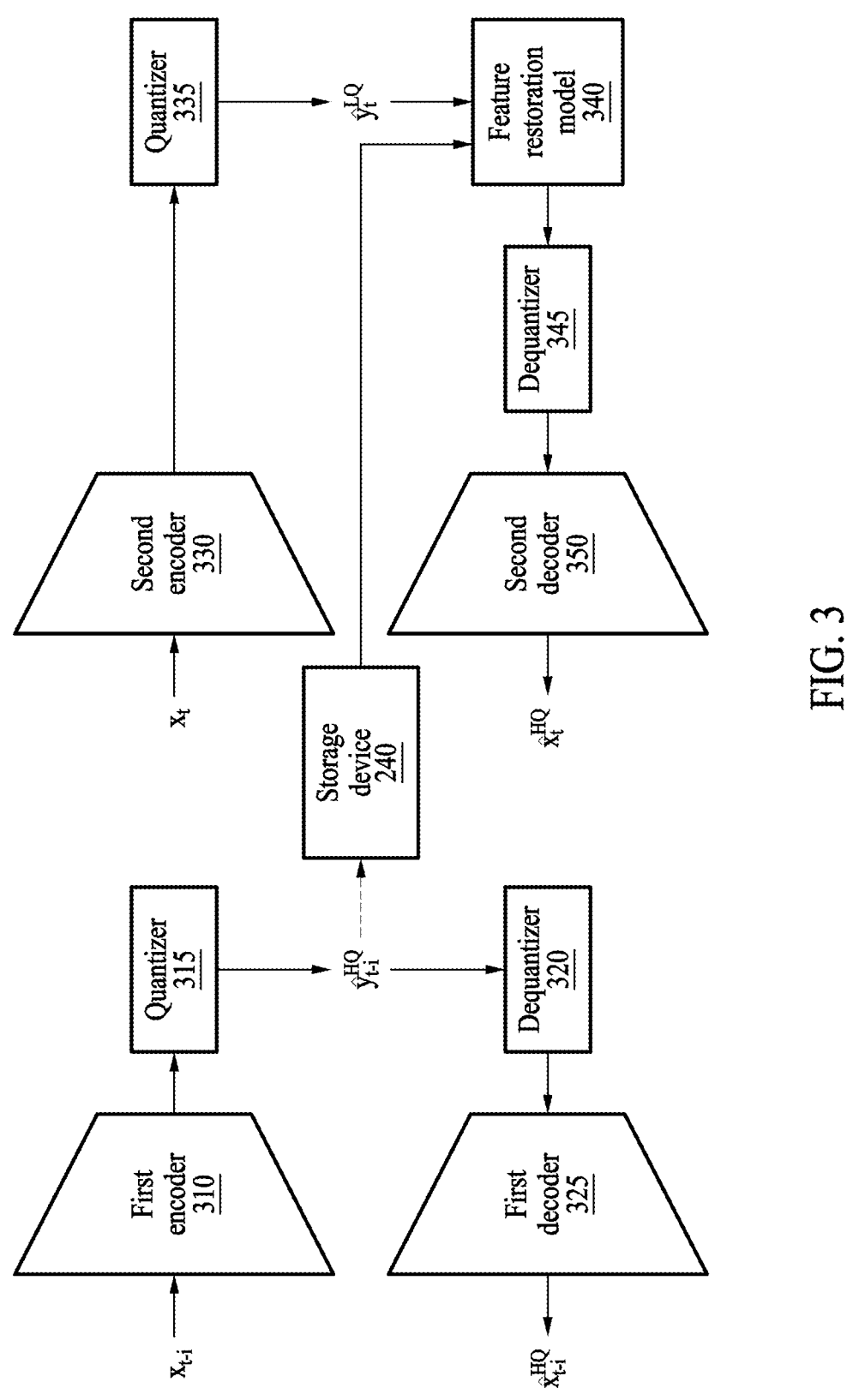
FIG. 3 illustrates an example image coding process, in accordance with one or more embodiments.

FIG. 3 illustrates an example image coding process, in accordance with one or more embodiments.

Referring to FIG. 3, an image encoding device (e.g., the image encoding device 110 of FIG. 1) may encode a reference frame $x_{t-i}$ (e.g., the I frame of the GOP). The image encoding device may extract feature data (e.g., a feature map) of the reference frame $x_{t-i}$ by inputting the reference frame 4, to a first encoder 310. The first encoder 310 may be an encoder for the reference frame $x_{t-i}$ and may compress the feature of the reference frame $x_{t-i}$ and output the compressed feature of the reference frame $x_{t-i}$. The first encoder 310 may be, as a non-limited example, a neural network that has been trained to output feature data by compressing an input image frame through implementing one or more hidden layers of the first neural network.

The feature data of the reference frame $x_{t-i}$ generated by the first encoder 310 may be quantized by a quantizer 315. Quantization may refer to dividing feature values included in feature data by certain intervals or quantization steps, so that the feature values may be represented as discrete values. Such a quantization method may include, as examples, scalar quantization, vector quantization, embedded quantization, and the like. However, the quantization method performed by the quantizer 315 is not limited thereto. The quantizer 315 may adjust encoding performance by adjusting a quantization parameter of the quantization. Reference feature data $$\hat{y}_{t-i}^{HQ}$$

of the reference frame $x_{t-i}$ may be output by the quantizer 315. The reference feature data $$\hat{y}_{t-i}^{HQ}$$

may be transmitted to an electronic device (e.g., the image decoding device 120 of FIG. 1 or the electronic device 200 of FIG. 2) through a network. The encoding process including the first encoder 310 and the quantizer 315 may implemented as a neural codec method. The reference feature data $$\hat{y}_{t-i}^{HQ}$$

may be defined as in Equation 1 below.

$$\hat{y}_{t-i}^{HQ} = Q\left(Enc^{HQ}(x_{t-i})\right) \qquad \text{Equation 1}$$

In an example, $x_{t-i}$ may denote a reference frame, which is an input image input to the first encoder 310, $Enc^{HQ}$ may denote the first encoder 310 for compressing a high-quality image frame (e.g., a reference frame), and Q may denote quantization performed by the quantizer 315.

In an example, the image encoding device may further transmit side information to the electronic device to increase a compression rate. In an example, the reference feature data $$\hat{y}_{t-i}^{HQ}$$

may be compressed by an additional encoder or another compression method, and the image encoding device may transmit the side information necessary to decompress the reference feature data $$\hat{y}_{t-i}^{HQ}$$

and to restore reference feature data $$\hat{y}_{t-i}^{HQ}$$

The electronic device 200 may store, in the storage device 240, the reference feature data $$\hat{y}_{t-i}^{HQ}$$

received from the image encoding device 110. The storage device 240 may perform the operations of a buffer that stores the reference feature data $$\hat{y}_{t-i}^{HQ}.$$

The reference feature data $$\hat{y}_{t-i}^{HQ}$$

may correspond to feature data of a reference frame corresponding to high quality. The reference feature data $$\hat{y}_{t-i}^{HQ}$$

may be used as a reference feature to restore feature data of other low-quality image frames into high-quality ones. The electronic device 200 may perform dequantization on the reference feature data $$\hat{y}_{t-i}^{HQ}$$

through a dequantizer 320, and obtain a reference frame $$\hat{x}_{t-i}^{HQ}$$

restored by using the first decoder 325 that takes the dequantized reference feature as an input. The first decoder 325 may be a decoder to restore a reference frame. The first decoder 325 may be, for example, a neural network that is trained to restore a reference frame from input feature data.

The image quality of the restored reference frame $$\hat{x}_{t-i}^{HQ}$$

may be determined by at least one of the first encoder 310, the quantizer 315, and the first decoder 325. The restored reference frame $$\hat{x}_{t-i}^{HQ}$$

may be defined as in Equation 2 below.

$$\hat{x}_{t-i}^{HQ} = Dec^{HQ}\left(IQ\left(\hat{y}_{t-i}^{HQ}\right)\right) \qquad \text{Equation 2}$$

In an example, $$\hat{y}_{t-i}^{HQ}$$

may denote the transmitted (and buffered) reference feature data, IQ may denote dequantization performed by the dequantizer 320, and $Dec^{HQ}$ may denote the first decoder 325 that restores a reference frame from input data.

After transmitting the reference feature data $$\hat{y}_{t-i}^{HQ}$$

of the reference frame $x_{t-i}$, the image encoding device 110 may perform encoding on a current frame $x_t$ (e.g., the B frame or P frame of the GOP) having lower image quality than the frame $x_{t-i}$. The current frame $x_t$ may be an image frame temporally adjacent to the reference frame $x_{t-i}$. The image encoding device may extract feature data (e.g., a feature map) of the current frame $x_t$ by inputting the current frame $x_t$ to the second encoder 330. The second encoder 330 may be an encoder for the current frame $x_t$ having lower image quality than the reference frame $x_{t-i}$ and may compress features of the current frame $x_t$ and output the compressed features of the current frame $x_t$. The second encoder 330 may be, for example, a neural network that is trained to output feature data by compressing an input image frame. According to an example, the second encoder 330 may compress the features of the current frame $x_t$, in the manner of compression based on motion prediction between image frames, compression based on motion compensation, or compression based on feature residue.

The feature data of the current frame $x_t$ may be quantized by a quantizer 335, and the low-quality feature data $$\hat{y}_{t}^{LQ}$$

of the current frame $x_t$ may be output by the quantizer 335. The quality of feature data transmitted to the electronic device 200 may be controlled by a quantization level of the quantizer 335. The low-quality feature data $$\hat{y}_{t}^{LQ}$$

may be defined as in Equation 3 below.

$$\hat{y}_{t}^{LQ} = Q\left(Enc^{LQ}(x_t)\right) \qquad \text{Equation 3}$$

In an example, $x_t$ may denote a current frame, which is an input image input to the second encoder 330, $Enc^{LQ}$ may denote the second encoder 330 for compressing a low-quality image frame (e.g., the current frame), and Q may denote quantization performed by the quantizer 335.

The image encoding device 110 may transmit the low-quality feature data $$\hat{y}_{t}^{LQ}$$

through a network to the electronic device 200. The image encoding device 110 may additionally compress and transmit the compressed low-quality feature data $$\hat{y}_{t}^{LQ}$$

to reduce the amount of data transmission. In an example, the image encoding device 110 may transmit an estimated motion vector between image frames or a feature data difference between image frames adjacent to each other, for inter prediction, e.g., as the compressed low-quality feature data $$\hat{y}_{t}^{LQ}.$$

The electronic device 200 may decode the current frame based on the low-quality feature data $$\hat{y}_t^{LQ}$$

and the previously received reference feature data $$\hat{y}_{t-i}^{HQ}.$$

The electronic device 200 may restore high-quality feature data $$\hat{y}_t^{HQ}$$

from the low-quality feature data $$\hat{y}_t^{LQ},$$

using the feature restoration model 340. The feature restoration model 340 may take the stored reference feature data $$\hat{y}_{t-i}^{HQ}$$

and low-quality feature data $$\hat{y}_t^{LQ}$$

as inputs to provide high-quality feature data $$\hat{y}_t^{HQ}$$

corresponding to the high-quality feature of the current frame. The high-quality feature data $$\hat{y}_t^{HQ}$$

may be defined as in Equation 4 below.

$$\hat{y}_t^{HQ} = FRNet\left(\hat{y}_{t-i}^{HQ}, \hat{y}_t^{LQ}\right) \qquad \text{Equation 4}$$

In an example, $$\hat{y}_t^{LQ}$$

may denote low-quality feature data of a current frame of t time, $$\hat{y}_{t-i}^{HQ}$$

may denote reference feature data, which is a high-quality feature of a reference frame, and FRNet may denote feature data restoration processing performed by the feature restoration model 340.

The feature restoration model 340 may be a neural network that is trained to output high-quality feature data by receiving reference feature data and low-quality feature data as inputs. The feature restoration model 340 may be, as an example, a neural network including a convolution layer, a neural network including an attention layer, or a transformer-based neural network, but is not limited thereto. The feature restoration model 340 may be implemented in various forms. The feature restoration model 340 may restore low-quality feature data to high-quality feature data when image frames of different times are encoded with different image qualities. In an example, not only reference feature data and low-quality feature data but also feature data warped to a current time by a motion vector may be additionally input to the feature restoration model 340. Alternatively, feature data warped to the current time by the motion vector may be input to the feature restoration model 340, instead of reference feature data, along with the low-quality feature data.

The electronic device 200 may perform dequantization on high-quality feature data $$\hat{y}_t^{HQ}$$

through a dequantizer 345 and obtain a current frame $$\hat{x}_t^{HQ}$$

restored by using the second decoder 350 that receives the dequantized high-quality feature as an input. The second decoder 350 may be a decoder that restores the current frame. The second decoder 350 may be, for example, a neural network that is trained to restore the current frame from the input feature data.

The quality of an image frame transmitted from the image encoding device 110 to the electronic device 200 may be adjusted by a quantization level performed by the image encoding device 110. The image encoding device 110 may reduce the amount of data transmission by transmitting the reference frame through reference frame feature data with high quality and image frames other than the reference frame through low quality feature data. The electronic device may restore low-quality feature data into high-quality one through the feature restoration model and then restore a high-quality image frame through the decoder.

The process of training the feature restoration model 340 may use at least one of a first loss function corresponding to feature restoration loss and a second loss function corresponding to image restoration loss. The first loss function and the second loss function may be used together or alternatively.

The first loss function may define, as a loss, a difference between restored feature data and actual high-quality feature data. The first loss function may be defined based on a difference between high-quality feature data, which is extracted by encoding a current training frame, and high-quality feature data of the current training frame, which is output by the feature restoration model that takes, as inputs, reference feature data extracted from a reference training frame of the first image quality and low-quality feature data extracted from the current training frame of the second image quality. Errors in a feature restoration process and a transmission process may be offset by training the feature restoration model 340 based on the first loss function. The first loss function may be defined as, for example, in Equation 5 below.

$$L_{feat} = Dist\left(\hat{y}_{tt}^{HQ}, y_{tt}^{HQ}\right) \qquad \text{Equation 5}$$

In an example, $L_{feat}$ may denote the first loss function, and $Dist(,)$ may be a metric function that measures a difference between two pieces of feature data, and may be implemented in various forms of distance functions, such as L1 and L2 norm.

$$\hat{y}_{tt}^{HQ}$$

may denote high-quality feature data of a current training frame output by the feature restoration model 340 that takes reference feature data extracted from a reference training frame and low-quality feature data extracted from the current learning frame as inputs.

$$y_{tt}^{HQ}$$

may denote high-quality feature data extracted by encoding a current training frame and may be defined, for example, as in Equation 6 below.

$$y_{tt}^{HQ} = Enc^{HQ}(x_{tt}) \qquad \text{Equation 6}$$

In an example, $x_{tt}$ may denote a current training frame and $Enc^{HQ}$ may denote an encoder (e.g., the first encoder 310) that extracts a high-quality feature from the current learning frame.

The second loss function may complement the first loss function. The first loss function may be applied to a feature area. The size of a feature map, which is feature data, may be less than the size of an original image frame (e.g., $\frac{1}{16}$ of the size of an image frame), and when training is performed by using only the first loss function, the spatial alignment of a decoded image frame may not be guaranteed. To supplement this, a difference between a decoded image frame and an original image frame may be defined as a loss in the second loss function. The second loss function may be defined based on a difference between the current training frame and a current training frame restored by decoding high-quality feature data extracted by encoding the current training frame. For example, the second loss function may be defined as in Equation 7 below.

$$L_{img} = Dist\left(Dec^{HQ}\left(\hat{y}_{tt}^{HQ}\right), x_{tt}^{HQ}\right) \qquad \text{Equation 7}$$

In an example, $L_{img}$ may denote the second loss function and $Dist(,)$ may denote a metric function that measures a difference between two pieces of feature data.

$$Dec^{HQ}\left(\hat{y}_{tt}^{HQ}\right)$$

may be a current training frame that is restored by inputting high-quality feature data $$\hat{y}_{tt}^{HQ}$$

of a current training frame output by the feature restoration model 340, to a decoder (e.g., the first decoder 325) to restore a high-quality image frame.

$$x_{tt}^{HQ}$$

may denote an original current training frame.

In an example, the total loss function for the feature restoration model 340 may be defined as a weighted sum of the first loss function and the second loss function. The feature restoration model 340 may be trained, so that the value of the total loss function decreases, and the parameters of the feature restoration model 340 may be updated to approach optimal values by training.

Figure 4:
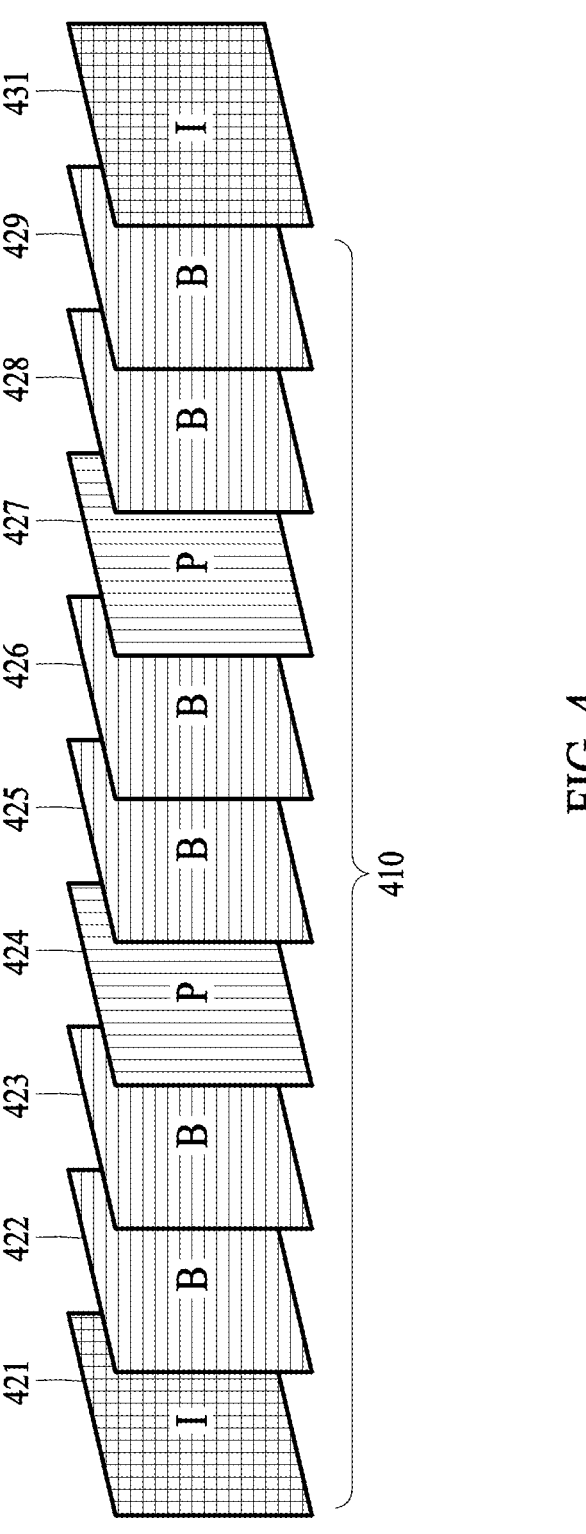
FIG. 4 illustrates an example group of pictures (GOP), in accordance with one or more embodiments.

FIG. 4 illustrates an example of a GOP, in accordance with one or more embodiments.

Referring to FIG. 4, one GOP 410 may include several image frames including an I frame 421 and B frames 422, 423, 425, 426, 428, and 429, and P frames 424 and 427. A video or a moving picture may include a plurality of GOPs 410. In an example, the GOP 410 may include the I frame 421, which does not depend on other image frames for image rendering, and the B frames 422, 423, 425, 426, 428, and 429 and the P frames 424 and 427, which depend on other image frames and have lower quality than the I frame 421. In an example, the I frame 421 may be a reference frame or a key frame of the GOP 410, and a next GOP of the GOP 410 may include another I frame 431. In an example, the number of B frames and the number of P frames included in the GOP 410 may vary, and are not limited to the illustrated example.

The I frame 421 may have the highest image quality but may have a large volume of data, and the B frames 422, 423, 425, 426, 428, and 429 and the P frames 424 and 427 may have lower image quality than the I frame 421, but may have a relatively less volume than the I frame 421. The B frames 422, 423, 425, 426, 428, and 429 and the P frames 424 and 427 may have a lesser amount of data transmission than the I frame 421, but may cause degradation in image quality. According to examples disclosed herein, an image encoding device (e.g., the image encoding device 110 of FIG. 1) may transmit the I frame 421 as high-quality reference feature data, and may transmit the B frames 422, 423, 425, 426, 428, and 429 and the P frames 424 and 427 as low-quality reference feature data to an electronic device (e.g., the image decoding device 120 of FIG. 1 or the electronic device 200 of FIG. 2). The electronic device 120/200 may store the reference feature data extracted from the I frame 421, and use the reference feature data when the feature data of the B frames 422, 423, 425, 426, 428, and 429 or the P frames 424 and 427 are restored. The electronic device 120 and/or 200 may obtain high-quality feature data of the B frames 422, 423, 425, 426, 428, and 429 or the P frames 424 and 427, using a feature restoration model that takes the reference feature data as an input, and may perform decoding based on the obtained high-quality feature data.

Such an image coding method above may reduce the volume of transmission data of image content and provide high-quality image content to a user.

Figure 5:
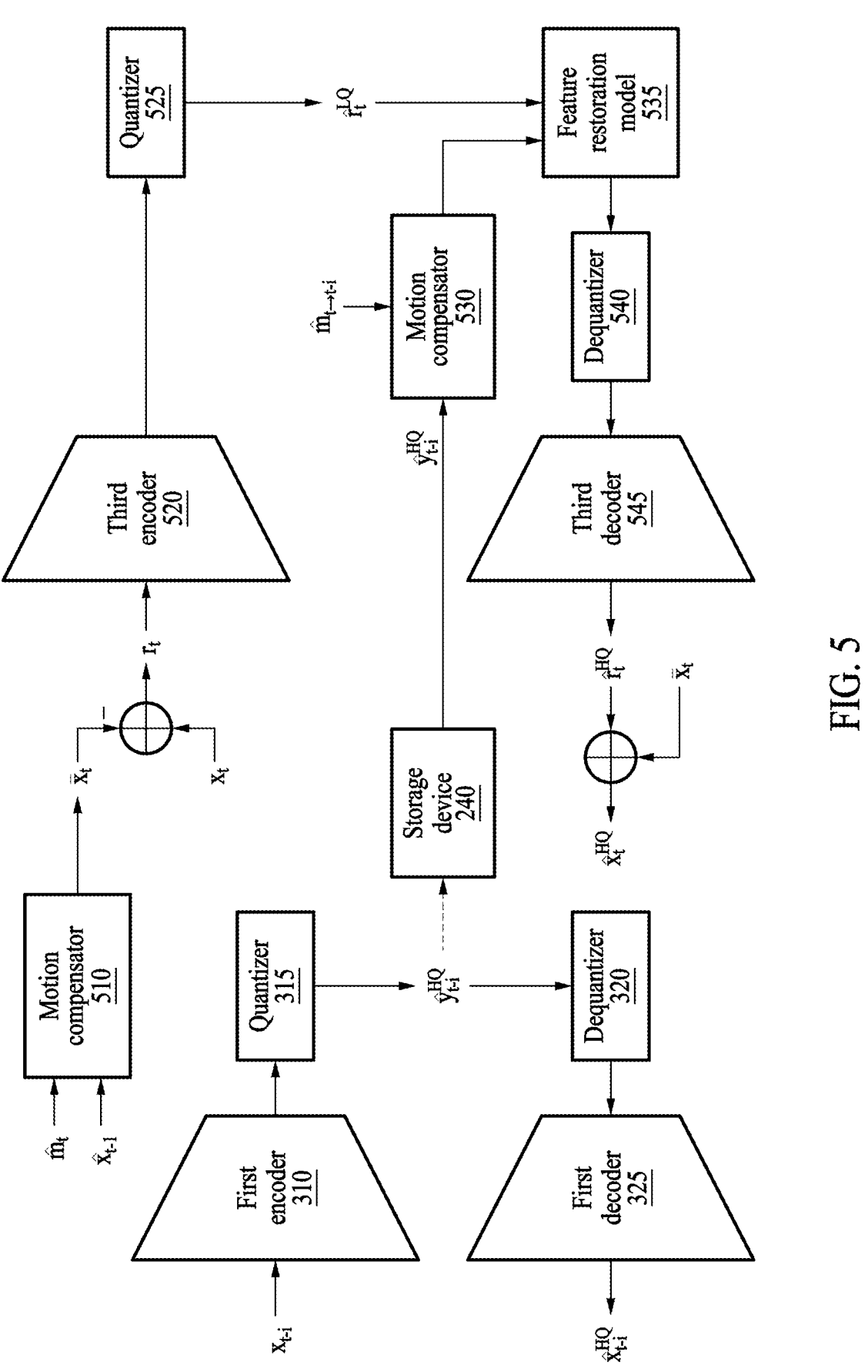
FIG. 5 illustrates an example image coding process, in accordance with one or more embodiments.

FIG. 5 illustrates an example image coding process, in accordance with one or more embodiments.

Referring to FIG. 5, an image encoding device (e.g., the image encoding device 110 of FIG. 1) may extract reference feature data $$\hat{y}_{t-i}^{HQ}$$

from a reference frame $x_{t-i}$ in the same manner as described above with reference to FIG. 3, and transmit the extracted reference feature data $$\hat{y}_{t-i}^{HQ}$$

to an electronic device (e.g., the image decoding device 120 of FIG. 1 or the electronic device 200 of FIG. 2). The electronic device 120 and/or 200 may store, in the storage device 240, the reference feature data $$\hat{y}_{t-i}^{HQ}$$

received from the image encoding device 110 in the same manner as described with reference to FIG. 3, and generate a reference frame $$\hat{x}_{t-i}^{HQ},$$

which is restored based on the reference feature data $$\hat{y}_{t-i}^{HQ}.$$

When the image encoding device 110 encodes a current frame $x_t$ of a second image quality having lower image quality than the reference frame $x_{t-i}$ of a first image quality, the image encoding device 110 may generate a motion compensation frame $\overline{X}_t$ in which the motion of a previous frame immediately before the current frame $x_t$ is compensated for by a motion compensator 510 based on a motion value. The motion compensation frame $\overline{X}_t$ may correspond to an inter-predicted current frame. The image encoding device 110 may generate a residual frame $r_t$ based on a difference between the current frame $x_t$ and the motion compensation frame $\overline{X}_t$ and may extract a feature map of the residual frame $r_t$ through a third encoder 520. The image encoding device 110 may perform quantization on the feature map of the residual frame $r_t$ through a quantizer 525 to obtain low-quality residual data, and may transmit the low-quality residual data to the electronic device 120 and/or 200.

In response to receipt of the low-quality residual data $$\hat{r}_t^{LQ},$$

the electronic device 120 and/or 200 may generate motion-compensated reference feature data by applying a motion compensation value $\hat{m}_{t \to t-i}$ to the reference feature data $$\hat{y}_{t-i}^{HQ}$$

through a motion compensator 530. The motion compensation value $\hat{m}_{t \to t-i}$ may represent a motion compensation value from the current frame to the reference frame. The electronic device 120 and/or 200 may obtain high-quality residual data, using the feature restoration model 535 that takes the motion-compensated reference feature data and the low-quality residual data $$\hat{r}_t^{LQ}$$

as inputs. The electronic device 120 and/or 200 may obtain a decoded residual frame $$\hat{r}_t^{HQ}$$

by decoding the high-quality residual data. The electronic device 120 and/or 200 may perform dequantization on the high-quality residual data through a dequantizer 540, and may obtain a decoded residual frame $$\hat{r}_t^{HQ},$$

using a third decoder 545 that takes the dequantized high-quality residual data as an input. The electronic device 120 and/or 200 may receive a current frame $$\hat{x}_t^{HQ}$$

having a higher image quality than the second image quality, based on the decoded residual frame $$\hat{r}_t^{HQ}$$

and the motion compensation frame $\overline{X}_t$. The current frame $$\hat{x}_t^{HQ}$$

may be generated by combining the decoded residual frame $$\hat{r}_t^{HQ}$$

and the motion compensation frame $\overline{X}_t$.

The residual frame $r_t$ may also lose information or may lose details of the image during the encoding process. However, the above image coding process may use the high-quality reference feature data $$\hat{y}_{t-i}^{HQ}$$

stored in the storage device 240 to restore the low-quality residual data $$\hat{r}_t^{LQ}$$

into a high-quality image.

Figure 6:
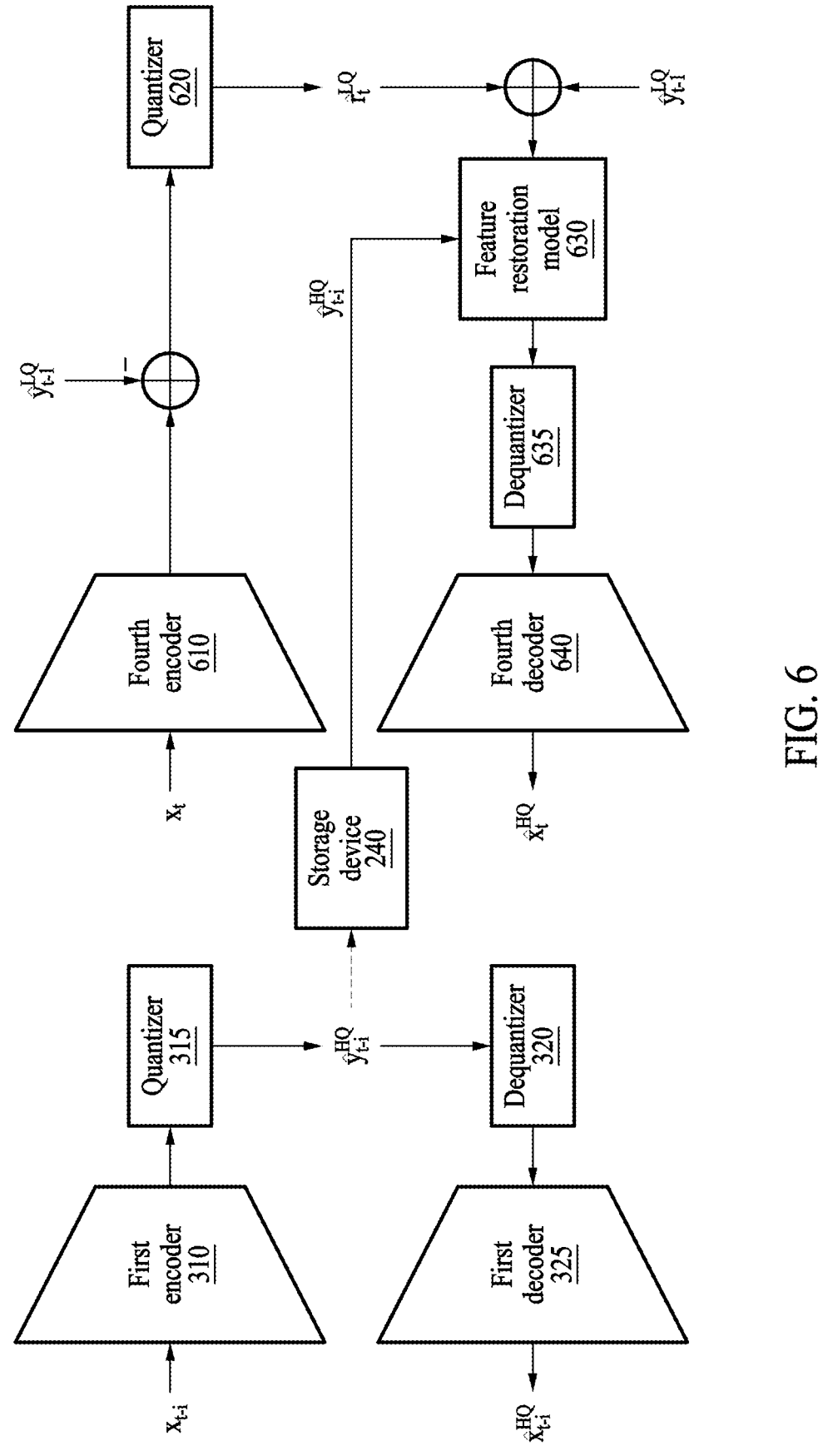
FIG. 6 illustrates an example image coding process, in accordance with one or more embodiments.

FIG. 6 illustrates an example image coding process, in accordance with one or more embodiments.

Referring to FIG. 6, an image encoding device (e.g., the image encoding device 110 of FIG. 1) may extract reference feature data $$\hat{y}_{t-i}^{HQ}$$

from a reference frame $x_{t-i}$ in the same manner as described with reference to FIG. 3, and transmit the extracted reference feature data $$\hat{y}_{t-i}^{HQ}$$

to an electronic device (e.g., the image decoding device 120 of FIG. 1 or the electronic device 200 of FIG. 2). The electronic device 120 and/or 200 may store, in the storage device 240, the reference feature data $$\hat{y}_{t-i}^{HQ}$$

received from the image encoding device 110 in the same manner as described with reference to FIG. 3 above, and may generate a reference frame $$\hat{x}_{t-i}^{HQ}$$

restored based on the reference feature data $$\hat{y}_{t-i}^{HQ}.$$

When the image encoding device 110 encodes a current frame $x_t$ of a second image quality having lower image quality than the reference frame $x_{t-i}$ of a first image quality, the image encoding device 110 may generate low-quality residual data $$\hat{r}_t^{LQ}$$

based on a difference between low-quality feature data $$\hat{y}_{t-1}^{LQ}$$

of a previous frame and low-quality feature data extracted by a fourth encoder 610 that receives the current frame $x_t$ as an input. The image encoding device 110 may generate the low-quality residual data $$\hat{r}_t^{LQ}$$

by quantizing a difference between the low-quality feature data and the low-quality feature data $$\hat{y}_{t-1}^{LQ}$$

of the previous frame, through a quantizer 620. The image encoding device 110 may transmit the low-quality residual data $$\hat{r}_t^{LQ}$$

to the electronic device 120 and/or 200.

In response to receipt of the low-quality residual data $$\hat{r}_t^{LQ},$$

the electronic device 120/200 may obtain low-quality feature data of a current frame, based on the low-quality feature data $$\hat{y}_{t-1}^{LQ}$$

of the previous frame and the low-quality residual data $$\hat{r}_t^{LQ}.$$

The low-quality feature data of the current frame may be generated by combining the low-quality feature data $$\hat{y}_{t-1}^{LQ}$$

and the low-quality residual data $$\hat{r}_t^{LQ}.$$

The electronic device 120 and/or 200 may obtain high-quality feature data of the current frame, by implementing a feature restoration model 630 that receives the low-quality feature data of the current frame and the reference feature data $$\hat{y}_{t-i}^{HQ}$$

as inputs. The electronic device 120 and/or 200 may perform dequantization on the high-quality feature data of the current frame through a dequantizer 635, and obtain a current frame $$\hat{x}_{t}^{HQ}$$

having higher image quality than the second image quality, by implementing a fourth decoder 640 that receives the dequantized high-quality feature data as an input.

Figure 7:
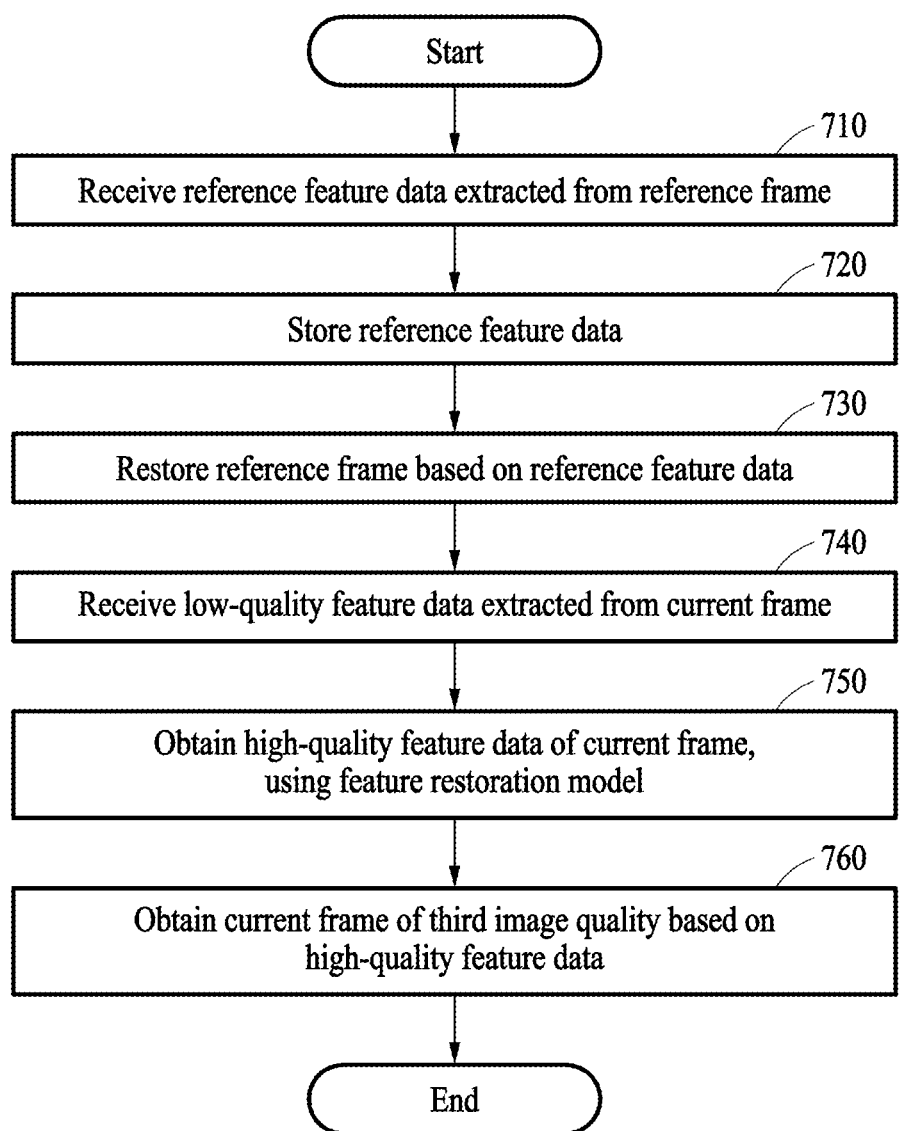
FIG. 7 illustrates example operations of an image processing method, in accordance with one or more embodiments.

FIG. 7 illustrates example operations of an example image processing method, in accordance with one or more embodiments. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose processor hardware configured by executed computer instructions. In addition to the description of FIG. 7 below, the descriptions of FIGS. 1-6 are also applicable to FIG. 7, and are incorporated herein by reference. Thus, the above description may not be repeated here.

In an example, the image processing method may be performed by an electronic device (e.g., the electronic device 200 of FIG. 2), and/or respectively by the image encoding device 110 and image decoding device 120 of FIG. 1, both being respective electronic devices described in the examples hereof. In an example, a system includes the image encoding device 110, and the image decoding device 120 (e.g., corresponding to the electronic device 200 of FIG. 2). In addition, as noted above, the electronic device 200 of FIG. 2 may also be representative of the processor 210 of electronic device 200 being configured to perform both encoding and decoding operations described herein, as in parallel, such as for a video conference, where the processor 210 performs encoding of video captured by the image processor and transmits the respective compressed frame feature data to another electronic device, and where the processor also decodes respective compressed frame feature data and displays the restored video frames using display 260 of FIG. 2.

Referring to FIG. 7, in operation 710, the electronic device may receive reference feature data extracted from a reference frame of a first image quality. The reference feature data may be obtained by performing quantization on a feature map of the reference frame extracted by a first encoder that receives the reference frame as an input.

In operation 720, the electronic device 120 and/or 200 may store the received reference feature data.

In operation 730, the electronic device 120 and/or 200 may restore a reference frame corresponding to the first image quality based on the reference feature data. The electronic device 120 and/or 200 may perform dequantization on the reference feature data (e.g., a feature map of the reference frame) to generate dequantized reference feature data, and may obtain a reference frame that is restored by implementing the first encoder that receives the dequantized reference feature data as an input.

In operation 740, the electronic device 120 and/or 200 may receive low-quality feature data extracted from a current frame having a second image quality that is lower than the first image quality. In a non-limited example, the reference frame may correspond to an I frame included in a GOP, and the current frame may be a B frame or a P frame included in the GOP. The low-quality feature data may be obtained by performing quantization on a feature map of the current frame extracted by a second encoder that receives the current frame as an input.

In operation 750, the electronic device 120 and/or 200 may obtain high-quality feature data of the current frame, by implementing a feature restoration model (e.g., the feature restoration model 340) that receives the reference feature data and the low-quality feature data as inputs. The feature restoration model may be a model that is trained to output high-quality feature data of a current frame by using reference feature data and low-quality feature data as input data.

In operation 760, the example electronic device 120 and/or 200 may receive a current frame having a third image quality that is higher than the second image quality, based on the high-quality feature data. The electronic device 120 and/or 200 may perform dequantization on the high-quality feature data to generate dequantized high-quality feature data, and may receive the current frame of the third image quality, by implementing a second decoder that receives the dequantized high-quality feature data as an input.

Figure 8:
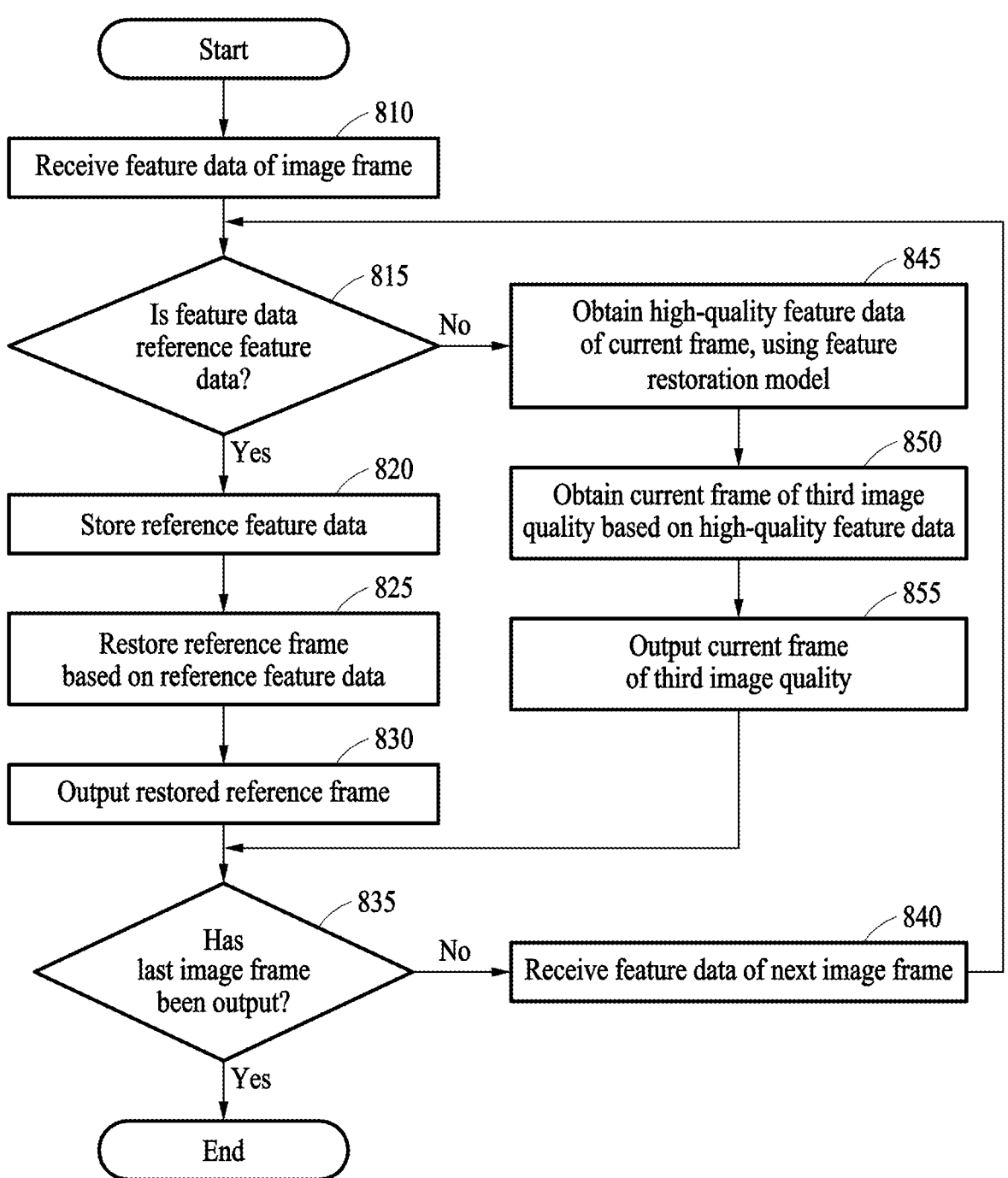
FIG. 8 illustrates example operations of an image processing method, in accordance with one or more embodiments.

FIG. 8 illustrates example operations of an image processing method, in accordance with one or more embodiments. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

The image processing method may be performed by an electronic device (e.g., the electronic device 200 of FIG. 2) described in the examples hereof.

Referring to FIG. 8, in operation 810, the electronic device 120 and/or 200 may receive feature data of an image frame. The feature data may be, for example, a feature map of the image frame extracted in an encoding process performed by an image encoding device (e.g., the image encoding device 110 of FIG. 1).

In operation 815, the electronic device 120 and/or 200 may determine whether the received feature data is reference feature data of a reference frame. The reference feature data may be feature data that is extracted from a reference frame (e.g., an I frame) corresponding to high image quality.

When the received feature data is the reference feature data ('yes' in operation 815), the electronic device 120 and/or 200 may store the reference feature data in operation 820.

In operation 825, the electronic device 120 and/or 200 may restore a reference frame corresponding to a first image quality, based on the reference feature data. The electronic device 120/200 performs dequantization on the reference feature data to generate dequantized reference feature data, and may restore the reference frame corresponding to the first image quality, by implementing a first decoder that receives the dequantized reference feature data as an input.

In operation 830, the electronic device 120 and/or 200 may output the restored reference frame through a display.

In operation 835, the electronic device 120 and/or 200 may determine whether a last image frame has been output. When the last image frame has not been output ('No' in operation 835), the electronic device 120 and/or 200 may receive feature data of a next image frame in operation 840. Thereafter, the electronic device 120 and/or 200 may perform the process from operation 815 again.

When feature data of an image frame received by the electronic device 120/200 is not the reference feature data of the reference frame ('No' in operation 815), the electronic device 120 and/or 200 may implement a feature restoration model to obtain high-quality feature data of a current frame. When the received feature data is not the reference feature data, the feature data may be feature data that is extracted from the current frame (e.g., a B frame or a P frame) having relatively low quality compared to the reference frame.

In operation 850, the electronic device 120 and/or 200 may obtain a current frame having a third image quality that is higher than a second image quality, based on the high-quality feature data. The electronic device 120 and/or 200 may perform dequantization on the high-quality feature data to generate dequantized high-quality feature data and restore the current frame corresponding to the third image quality, by implementing a second decoder that receives the dequantized high-quality feature data as an input.

In operation 855, the electronic device 120 and/or 200 may output the restored current frame of the third image quality through the display.

In operation 835, the electronic device 120 and/or 200 may determine whether a last image frame has been output, and when the last image frame has not been output, the process from operation 840 may be performed again. When the last image frame has been output ('yes' in operation 835), the present image processing method may come to an end.

The image encoding device 110, image decoding device 120, processor 210, memory 220, communication device 230, storage device 240, first encoder 310, quantizer 315, dequantizer 320, first decoder 325, second decoder 330, quantizer 335, feature restoration model 340, dequantizer 345, second decoder 350, motion compensator 510, third encoder 520, third decoder 545, motion compensator 530, dequantizer 540, feature restoration model 535, quantizer 525, fourth encoder 610, fourth decoder 640, dequantizer 635, quantizer 620, feature restoration model 630, and other devices of FIGS. 1-8, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-8, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device, comprising:
one or more processors configured to execute instructions; and
a memory storing the instructions which, when executed by the one or more processors, configures the one or more processors to:

generate high-quality feature data of a current frame, by implementing a feature restoration model that is provided reference feature data, received by an electronic device, and corresponding to compressed feature data of a reference image corresponding to a first time that is different from a second time to which the current frame corresponds, and low-quality feature data received by the electronic device, and corresponding to compressed data of the current frame, that has a lower image quality than the reference image; and
generate a current frame of a third image quality higher than the lower image quality, based on the high-quality feature data,
wherein the high-quality feature data is of higher quality than the low-quality feature data and the low-quality feature data is of lower quality than the reference feature data.

2. The electronic device of claim 1, wherein the execution of the instructions configures the one or more processors to restore the reference image using a first decoder provided the reference feature data, and wherein
the reference feature data is representative of having been generated by performing quantization on a feature map of a reference frame extracted from the reference frame, and
the low-quality feature data is representative of having been generated by performing quantization on a feature map of the current frame extracted from the current frame.

3. The electronic device of claim 1, wherein, in the execution of the instructions, the one or more processors are configured to restore the reference frame from the reference feature data.

4. The electronic device of claim 3, wherein, in the execution of the instructions, the one or more processors are configured to:
perform dequantization on the reference feature data to generate dequantized reference feature data; and
generate the restored reference frame from the dequantized reference feature data.

5. The electronic device of claim 1, wherein, in the execution of the instructions, the one or more processors are configured to:
perform dequantization on the high-quality feature data to generate dequantized high-quality feature data; and
generate the current frame of the third image quality from the dequantized high-quality feature data.

6. The electronic device of claim 1, wherein the reference frame corresponds to an I frame comprised in a group of pictures (GOP) of a video having a plurality of frames, and
the current frame corresponds to a B frame or a P frame comprised in the GOP.

7. The electronic device of claim 6, wherein the electronic device further includes a storage device configured to store respective received reference feature data for each of two or more GOPs.

8. The electronic device of claim 1, wherein the feature restoration model is a neural network comprising any one or any combination of two or more of a convolution layer, a first layer, and an attention layer, and a transformer-based neural network.

9. The electronic device of claim 1, wherein the feature restoration model is trained based on at least one of:
a first loss function based on a difference between high-quality feature data, which is extracted by encoding a current training frame of a second image quality, and high-quality feature data of the current training frame, which is output by the feature restoration model that receives, as inputs, reference feature data extracted from a reference training frame of a first image quality and low-quality feature data extracted from the current training frame; and a second loss function based on a difference between the current training frame and a current training frame restored by decoding the high-quality feature data extracted by encoding the current training frame.

10. An electronic device comprising:

a communication device configured to:

receive reference feature data extracted from a reference frame of a first image quality; and receive first low-quality residual data that indicates a difference between low-quality feature data of a previous frame and low-quality feature data extracted from a current frame of a second image quality lower than the first image quality, or receive second low-quality residual data extracted from a residual frame between a motion compensation frame, in which a motion of the current frame is compensated for, and a motion compensation frame, in which a motion of the previous frame is compensated for;

one or more processors configured to execute instructions; and a memory storing the instructions which, when executed by the one or more processors, configures the one or more processors to:

generate low-quality feature data of the current frame, based on the low-quality feature data of the previous frame and the first low-quality residual data, in response to a receipt of the first low-quality residual data;

generate high-quality feature data of the current frame, by implementing a first feature restoration model that receives the reference feature data and the low-quality feature data of the current frame as inputs; and generate a current frame of a third image quality higher than the second image quality, based on the high-quality feature data, wherein the high-quality feature data is of higher quality than the low-quality feature data and the low-quality feature data is of lower quality than the reference feature data.

11. The electronic device of claim 10, wherein in the execution of the instructions, the one or more processors are configured to:

in response to receipt of the second low-quality residual data, generate motion-compensated reference feature data, which is generated by applying a motion compensation value to the reference feature data, and high-quality residual data by implementing a second feature restoration model that is provided the second low-quality residual data;

generate a decoded residual frame by decoding the high-quality residual data; and generate a current frame of a fourth image quality higher than the second image quality, based on the decoded residual frame and an inter-predicted current frame, and wherein the high-quality residual data is of higher quality than the second low-quality residual data.

12. A processor-implemented method, comprising:

generating high-quality feature data of a current frame, by implementing a feature restoration model that is provided reference feature data, received by an electronic device, and corresponding to compressed feature data of a reference image corresponding to a first time that is different from a second time to which the current frame corresponds, and low-quality feature data received by the electronic device, and corresponding to compressed data of the current frame, that has a lower image quality than the reference image; and generating a current frame of a third image quality higher than the lower image quality, based on the high-quality feature data.

13. The method of claim 12, wherein:

the reference feature data is representative of having been generated by performing quantization on a feature map of a reference frame extracted from the reference frame, and the low-quality feature data is representative of having been generated by performing quantization on a feature map of the current frame extracted from the current frame.

14. The method of claim 12, further comprising restoring the reference frame from the reference feature data.

15. The method of claim 14, wherein the restoring of the reference frame comprises:

performing dequantization on the reference feature data to generate dequantized reference feature data; and generate the restored reference frame from the dequantized reference feature data.

16. The method of claim 12, wherein the generating of the current frame of the third image quality comprises:

performing dequantization on the high-quality feature data to generate dequantized high-quality feature data; and generating the current frame of the third image quality from the dequantized high-quality feature data.

17. The method of claim 12, wherein the reference frame corresponds to an I frame comprised in a group of pictures (GOP) of a video having a plurality of frames, and the current frame corresponds to a B frame or a P frame comprised in the GOP.

18. The method of claim 12, wherein the feature restoration model is a neural network comprising any one or any combination of two or more of a convolution layer, a first layer, and an attention layer, and a transformer-based neural network.

19. A non-transitory computer-readable storage medium storing instructions that, when executed by a processor, cause the processor to perform the method of claim 12.

* * * * *